United States Patent
Adamczak et al.

(10) Patent No.: US 12,392,385 B2
(45) Date of Patent: Aug. 19, 2025

(54) FILTER IDENTIFICATION IN A SYSTEM FOR CAPTURING BRAKING PARTICLES

(71) Applicant: TALLANO TECHNOLOGIE, Boulogne Billancourt (FR)

(72) Inventors: Loïc Adamczak, Boulogne Billancourt (FR); Christophe Rocca-Serra, Paris (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 375 days.

(21) Appl. No.: 17/802,504

(22) PCT Filed: Feb. 24, 2021

(86) PCT No.: PCT/EP2021/054607
§ 371 (c)(1),
(2) Date: Aug. 25, 2022

(87) PCT Pub. No.: WO2021/170679
PCT Pub. Date: Sep. 2, 2021

(65) Prior Publication Data
US 2023/0147482 A1 May 11, 2023

(30) Foreign Application Priority Data
Feb. 28, 2020 (FR) ..................... 2002024

(51) Int. Cl.
| | | |
|---|---|---|
| F16D 65/00 | (2006.01) | |
| B60T 17/00 | (2006.01) | |
| B60T 17/22 | (2006.01) | |

(52) U.S. Cl.
CPC ........ *F16D 65/0031* (2013.01); *B60T 17/002* (2013.01); *B60T 17/221* (2013.01)

(58) Field of Classification Search
CPC ... B60T 17/221; B60T 17/002; F16D 65/0031
See application file for complete search history.

(56) References Cited

U.S. PATENT DOCUMENTS

| | | | | |
|---|---|---|---|---|
| 2008/0295685 A1* | 12/2008 | Uhland | ................ | B01D 46/009 96/417 |
| 2014/0262633 A1 | 9/2014 | Kunzler et al. | | |
| | | (Continued) | | |

FOREIGN PATENT DOCUMENTS

| | | |
|---|---|---|
| FR | 3 057 040 | 4/2018 |
| FR | 3081781 A1 | 12/2019 |
| | (Continued) | |

OTHER PUBLICATIONS

Translation of Japanese Patent No. JP 2001-286717 obtained from website: https://worldwide.espacenet.com on Nov. 5, 2024.*

(Continued)

*Primary Examiner* — Pamela Rodriguez
(74) *Attorney, Agent, or Firm* — NIXON & VANDERHYE

(57) ABSTRACT

Disclosed is a system for capturing braking particles from a friction brake system, which includes a vacuum source, a pneumatic circuit that connects the friction brake system to the vacuum source, and a filter located on the pneumatic circuit and mounted on a support. The capturing system includes a control unit and an identification device for identifying the current filter, which is capable of sending at least one signal to the control unit, the signal including at least one current characteristic of the current filter, the control unit being capable of comparing the at least one current characteristic with at least one reference characteristic of a reference filter and informing a user when the at least one current characteristic and the at least one reference characteristic are dissimilar.

7 Claims, 1 Drawing Sheet

(56) References Cited

U.S. PATENT DOCUMENTS

| | | | |
|---|---|---|---|
| 2020/0049213 A1 | 2/2020 | Rocca-serra | |
| 2021/0090362 A1* | 3/2021 | Tian | G07C 5/085 |
| 2021/0140498 A1 | 5/2021 | Kuemmerling | |
| 2023/0069677 A1* | 3/2023 | McDonagh | B03C 3/12 |
| 2023/0142603 A1* | 5/2023 | Adamczak | F16D 65/0031 |
| | | | 188/1.11 R |

FOREIGN PATENT DOCUMENTS

| | | |
|---|---|---|
| GB | 2538735 | 11/2016 |
| JP | 2001-286717 | 10/2001 |
| JP | 2019529840 A | 10/2019 |
| KR | 10-2005-0069079 | 7/2005 |
| KR | 10-2017-0026869 | 3/2017 |
| WO | 2016188809 A1 | 12/2016 |
| WO | 2019224034 A1 | 11/2019 |

OTHER PUBLICATIONS

Office Action, issued in Japanese Patent Application No. 2022-551711 dated Nov. 27, 2023.
International Search Report for PCT/EP2021/054607 dated Mar. 22, 2021, 6 pages.
Written Opinion of the ISA for PCT/EP2021/054607 dated Mar. 22, 2021, 6 pages.

* cited by examiner

[Fig. 1]
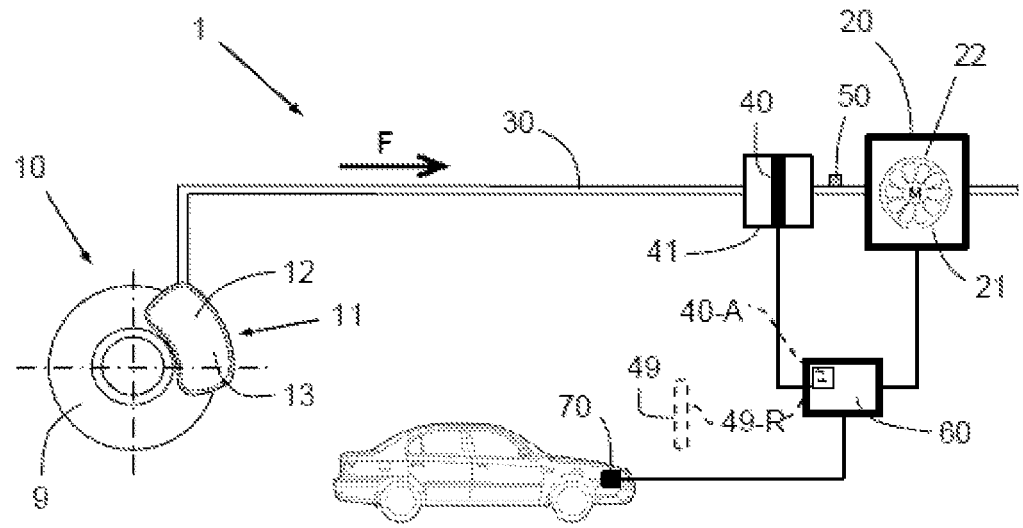
[Fig. 2]
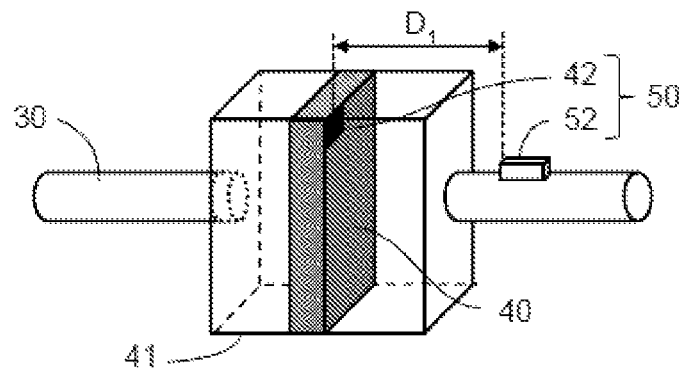
[Fig. 3]
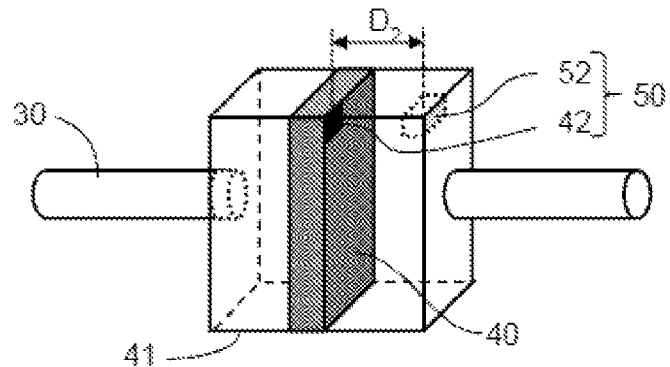

FILTER IDENTIFICATION IN A SYSTEM FOR CAPTURING BRAKING PARTICLES

CROSS-REFERENCE TO RELATED APPLICATIONS

This application is the U.S. national phase of International Application No. PCT/EP2021/054607 filed Feb. 24, 2021 which designated the U.S. and claims priority to French Patent Application No. 2002024 filed Feb. 28, 2020, the entire contents of each of which are hereby incorporated by reference.

BACKGROUND OF THE INVENTION

Field of the Invention

This invention relates to a system for capturing braking particles from a friction brake system, which comprises a vacuum source, a pneumatic circuit that connects the friction brake system to the vacuum source, and a current filter located on the pneumatic circuit and mounted on a support.

Description of the Related Art

Such friction brake systems may equip road or rail vehicles. Such friction brake systems may also equip stationary rotor devices such as wind turbines or industrial machines.

In such systems, there is provided a vacuum source (for example a suction turbine driven by a motor) which is connected by a pneumatic circuit to the friction brake system, and a filter for collecting particles emitted by the brake system. This filter is placed upstream of the vacuum source, and prevents the passage of particles through the vacuum source and their release into the atmosphere. However, in certain situations, the current filter (i.e. the filter currently mounted in the system) does not have the same characteristics (for example it is of a different model or brand) as the reference filter, which is the filter appropriate for the capture system. This difference in at least one of the characteristics is detrimental because the current filter may not perform as efficiently as the reference filter. The current filter is then unsuitable.

SUMMARY OF THE INVENTION

The invention aims to remedy these disadvantages.

The invention aims to provide a system for capturing braking particles which makes it possible to ensure that the current filter is identical to the reference filter.

This object is achieved by means of the fact that the capturing system comprises a control unit and an identification device for identifying the filter, which is capable of sending a signal to the control unit, the signal comprising at least one current characteristic of the current filter, the control unit being capable of comparing the at least one current characteristic with at least one reference characteristic of a reference filter and informing a user when the at least one current characteristic and said at least one reference characteristic are dissimilar.

By means of these arrangements, the current filter is identified with certainty, and its relevant characteristics are compared with those of a reference filter which is the filter that should be installed in the capturing system. Consequently, when at least one of these characteristics of the filter currently installed in the capturing system is not identical to that of the reference filter, the user is so informed. The user can then act to prevent the vehicle or stationary machine from continuing to operate with an unsuitable filter. This user action is normally the replacement of this unsuitable filter by an appropriate filter identical to the reference filter.

For example, the current characteristic of the current filter is unique and the reference characteristic of the reference filter is unique For example, the current filter has a plurality of N characteristics and there is a plurality of N reference characteristics, and the control unit is capable of comparing each of the current characteristics with each of the reference characteristics, two by two, and informing a user when, for at least one integer value of n between 1 and N, the current characteristic and the reference characteristic are dissimilar.

Advantageously, a portion of the identification device contains the at least one current characteristic of the current filter, this portion being carried by the current filter.

The reliability of the identification of the current filter is thus reinforced.

The invention also relates to a method for identifying a filter in a system for capturing braking particles from a friction brake system, this capturing system comprising a vacuum source, a pneumatic circuit that connects the friction brake system to the vacuum source, and a current filter which is located on the pneumatic circuit and which is mounted on a support.

According to the invention, the method comprises the following steps:
(a) A control unit and an identification device for identifying the current filter are provided which are part of the capturing system;
(b) The identification device sends at least one signal to the control unit, this signal comprising at least one current characteristic of the current filter;
(c) The control unit compares the at least one current characteristic with at least one reference characteristic of a reference filter and informs a user when the at least one current characteristic and the at least one reference characteristic are dissimilar.

BRIEF DESCRIPTION OF THE DRAWINGS

The invention will be better understood and its advantages will become more apparent upon reading the following detailed description of some embodiments represented as non-limiting examples. The description refers to the accompanying drawings, in which:

FIG. 1 is a schematic view of a capturing system according to the invention,

FIG. 2 is a perspective view of a housing carrying a filter, and an embodiment of a detection device for detecting this filter in the capturing system of FIG. 1, FIG. 3 is a perspective view of a housing carrying a filter, and of another embodiment of a detection device for detecting this filter in the capturing system of FIG. 1.

DESCRIPTION OF THE PREFERRED EMBODIMENTS

FIG. 1 schematically shows a system for capturing particles 1 according to the invention, these particles being emitted by a friction brake system 10.

This friction brake system 10 comprises a brake pad 11 for braking a vehicle. This pad 11 comprises a backing plate 12 and a lining 13 made of friction material fixed to the backing plate 12. In FIG. 1, the pad 11 is viewed from below, the plate 12 being in the foreground.

The pad 11 (first pad) is facing a disc 9 which is driven by the wheel of the vehicle. A second identical pad (not visible) is located on the other side of the disc 9 and opposite the first pad 11 so that these two pads sandwich the disc 9. The braking of the disc 9 is achieved by friction of the two linings (13) against the disc 9 when these two pads approach the disc 9.

The capturing system 1 comprises a pneumatic circuit 30 and a vacuum source 20. The pad 11 and the second pad are connected to the vacuum source 20 via this pneumatic circuit 30. For example, the vacuum source 20 comprises an electric motor 21 and a suction turbine 22 which is driven by this electric motor 21.

In operation, the vacuum source 20 is capable of suctioning in the particles upon their emission by the linings (13), through the pneumatic circuit 30. The direction of circulation of the air and particles is indicated by the arrow F in FIG. 1. The capturing system 1 further comprises a filter 40 which is located on the circuit 30, meaning that the air which circulates within the circuit 30 passes through the filter. This filter 40 is mounted on a support 41. For example, the support 41 is a housing which houses the filter 40 therein, as shown in the figures. The filter 40 thus separates the housing 41 into an upstream portion and a downstream portion. The air coming from the upstream portion of the circuit 30 enters the housing 41 at the upstream end of the housing 41, passes through the filter 40, and exits the housing 41 at the downstream end of the housing 41 to enter the downstream portion of the circuit 30. The term "current filter" refers to the filter 40 which is actually mounted on the support 41 during operation of the vacuum source 20.

The capturing system 1 further comprises a control unit 60 and a detection device 50 for detecting the filter 40. The control unit 60 receives signals from the detection device 50 (which comprises an element for generating and sending these signals), and is also capable of controlling the vacuum source 20 and receiving information therefrom. These interactions between the control unit 60, the detection device 50, and the vacuum source 20 are represented schematically in FIG. 1 by solid lines. These interactions may be implemented by electric lines. The operation of this control unit 60 and of this detection device 50 is described below.

The control unit 60 and the identification device 50 make it possible to determine whether the current filter 40 is identical to or different from a reference filter 49. The reference filter 49 is for example the filter which was initially installed in the vehicle or stationary machine. It is then called the initial filter. This reference filter 49 is schematically represented with dotted lines in FIG. 1. This filter is thus a filter of a certain type and/or of a certain brand, and has a certain number of characteristics 49-R. The current filter possesses a certain number of characteristics 40-A. "Characteristic" is understood to mean for example a characteristic value of a measurement made on this filter. This value may be a geometric dimension of the filter, a density of the filter material, a filtration efficiency of the filter, a measurement of the pressure drop through the filter, an extent of the surface area of the filtration media, the number of overlapping layers of the filter media. This characteristic may also be a shape of the filter. For example, these characteristics are those expected of the filter for proper operation of the capturing system 1. These characteristics 40-A and 49-R are schematically indicated in FIG. 1 as being integrated (received and/or stored) into the control unit 60.

During operation of the capturing system 1, the identification device 50 sends at least one signal to the control unit 60. "At least one signal" is understood to mean the sending of either a continuous signal or a signal at regular intervals or an isolated signal. This signal comprises at least one current characteristic 40-A of the current filter 40. The control unit 60 stores in memory at least one reference characteristic 49-R of a reference filter 49. If there is only one characteristic 40-A, the reference characteristic 49-R is related to characteristic 40-A such that if the current filter 40 and the reference filter 49 are identical, characteristic 40-A is substantially equal to reference characteristic 49-R. "Substantially equal" is understood to mean that the characteristic is within a restricted interval around the reference characteristic. For example, this interval is +/−1%, or +/−2%, or +/−5%, or +/−10% of the value of the reference characteristic. If there is a plurality of N characteristics 40-A (40-A (1), 40-A (2) . . . 40-A (N) with N being an integer), then there is a plurality of N characteristics 49-R (49-R (1), 49-R (2), . . . 49-R (N)), and each of the reference characteristics 49-R (n), with n being an integer between 1 and N, is related to characteristic 40-A (n) such that if the current filter 40 and the reference filter 49 are identical, characteristic 40-A (n) is substantially equal to reference characteristic 49-R (n). The control unit 60, upon receiving the signal comprising the current characteristic or characteristics 40-A, compares this or these characteristics with characteristic or characteristics 49-R. Thus, if there is a single characteristic 40-A, the control unit 60 compares characteristics 40-A and 49-R. If there is a plurality of N characteristics 40-A (n), the control unit 60 compares characteristics 40-A (n) and 49-R (n) two by two, for each of the integers n between 1 and N. If, at the end of this or these comparisons, at least one of the current characteristics 40-A and reference characteristics 49-R are dissimilar (meaning not substantially equal), then the control unit 60 informs the user that the current filter 40 is not a suitable filter (because it is not identical to the reference filter 49).

This information may be provided by any means, for example by displaying text such as "Inappropriate filter" or a logo or an indicator light on the dashboard of the vehicle, and/or for example by stimulation of the user by vibrations via a vibratory system located in the seat and controlled by the control unit 60. In addition, this information may be accompanied by a limitation of the speed of the vehicle, using a limiter 70 which is controlled by the control unit 60 (FIG. 1). The generation of particles during braking is consequently reduced, and the release of these harmful particles into the vacuum source 20 is also reduced.

An embodiment of the identification device 50 for identifying the filter 40 is described below, with reference to FIG. 2.

The identification device 50 comprises a contactless detector 52 and an identifier (tag) 42 which is carried by the filter 40. The contactless detector 52 is capable of detecting the identifier 42 within a certain volume $V_0$ around this detector 54. This detection is carried out for example with RFID technology. RFID technology groups those technologies where the identifier is powered remotely by the detector. The contactless detector 52 is fixed close to the filter 40, meaning that the identifier 42 is located within the volume $V_0$ around the contactless detector 54. The identifier 42 is specific to the current filter 40, and contains in memory the characteristic or characteristics 40-A of the current filter 40.

The contactless detector 52 is fixed to the pipe 30 upstream or downstream of the support 41 such that the contactless detector 52 is located at a distance $D_1$ from the identifier 42 when the support 41 carrying the filter 40 is mounted on the pipe 30. In this case, the contactless detector 52 sends a signal to the control unit 60, this signal containing the characteristic or characteristics 40-A of the current filter 40. The control unit 60, upon receiving this signal, compares characteristic or characteristics 40-A with characteristic or characteristics 49-R.

In another embodiment, illustrated in FIG. 3, the contactless detector 52 is fixed on the support 41 (for example it is placed in the housing when the support 41 is a housing), and the identifier 42 is carried by the filter 40, such that the contactless detector 54 is located at a distance $D_2$ (less than $D_1$) from the identifier 42 when the filter 40 is mounted on the support 41.

The identification device 50 comprises a portion (for example the identifier 42) which contains the characteristics 40-A of the current filter 40. When this portion is carried by this filter 40, the capturing system 1 is capable of determining whether the filter 40 is different from the reference filter 49, even in the case where the support 41 which is mounted on the pipe 30 is identical to a support carrying the reference filter 49 but in which an unsuitable filter 40 (therefore different from the filter of reference 49) is mounted (mistakenly or intentionally) on this support 41. In the above cases, this portion is the identifier 42.

In the case where it is the support 41 which carries the portion of the identification device 50 which contains the characteristics of the filter intended to be received in this support 41 (i.e. the filter appropriate for this support), and where the filter 40 actually mounted in the support 41 is the filter which is appropriate for this support 41, the signal which is sent to the control unit 60 contains the correct information about the filter 40 mounted in the support 41. However, a problem occurs when the filter 40 actually mounted in the support 41 (mistakenly or intentionally) is not the appropriate filter for this support 41. Indeed, in this case, the filter actually mounted in the support 41 does not have the characteristics of the filter 40 appropriate for this support 41. The identification device 50 will then send to the control unit 60 a signal which contains the characteristics of the filter 40 appropriate for this support 41, whereas the filter actually mounted in this support 41 does not have these characteristics. This results in a problem, since the support 41 may be appropriate but the filter 40 actually mounted on the support 41 is unsuitable and the user will not be informed that this filter 40 is unsuitable. This problem is avoided when the portion of the identification device 50 which contains the characteristics 40-A of the current filter 40 is carried directly by this filter 40. This constitutes additional security.

The invention also relates to a method for identifying a filter 40 in a system 1 for capturing braking particles from a friction brake system 10. As described above, this capturing system 1 comprises a vacuum source 20, a pneumatic circuit 30 that connects the friction brake system 10 to the vacuum source 20, and a current filter 40 which is located on the pneumatic circuit 30 and which is mounted on a support 41. The method comprises the following steps:

(a) A control unit 60 and an identification device 50 for identifying the current filter 40 are provided, which are part of the capturing system 1;

(b) The identification device 50 sends at least one signal to the control unit 60, this signal comprising at least one current characteristic 40-A of the current filter 40;

(c) The control unit 60 compares the at least one current characteristic 40-A with at least one reference characteristic 49-R of a reference filter 49, and informs a user when the at least one current characteristic 40-A and the at least one reference feature 49-R are dissimilar.

The invention claimed is:

1. System for capturing braking particles from a friction brake system, which comprises a vacuum source, a pneumatic circuit that connects said friction brake system to said vacuum source, and a current filter located on said pneumatic circuit and mounted on a support, wherein said capturing system comprises a control unit and an identification device for identifying said filter, which is capable of sending at least one signal to said control unit, said signal comprising at least one current characteristic of said current filter, said control unit being capable of comparing said at least one current characteristic with at least one reference characteristic of a reference filter, and informing a user when said at least one current characteristic and said at least one reference characteristic are dissimilar.

2. The capturing system according to claim 1, wherein said current characteristic of the current filter is unique and the reference characteristic of the reference filter is unique.

3. The capturing system according to claim 2, wherein a portion of said identification device contains the at least one current characteristic of the current filter, this portion being carried by said current filter.

4. The capturing system according to claim 1, wherein said current filter has a plurality of N characteristics and there is a plurality of N reference characteristics where n is an integer between 1 and N, and said control unit is capable of comparing each of the current characteristics with each of the reference characteristics, two by two, and informing a user when, for at least one value of n, the current characteristic and the reference characteristic are dissimilar.

5. The capturing system according to claim 4, wherein a portion of said identification device contains the at least one current characteristic of the current filter, this portion being carried by said current filter.

6. The capturing system according to claim 1, wherein a portion of said identification device contains the at least one current characteristic of the current filter, this portion being carried by said current filter.

7. Method for identifying a filter in a system for capturing braking particles from a friction brake system, this capturing system comprising a vacuum source, a pneumatic circuit that connects the friction brake system to the vacuum source, and a current filter which is located on said pneumatic circuit and which is mounted on a support, said method comprising:

A control unit and an identification device for identifying said current filter are provided which are part of the capturing system;

Said identification device sends at least one signal to the control unit, this signal comprising at least one current characteristic of said current filter;

Said control unit compares said at least one current characteristic with at least one reference characteristic of a reference filter, and informs a user when the at least one current characteristic and the at least one reference characteristic are dissimilar.

\* \* \* \* \*